United States Patent
Winkelvos et al.

(10) Patent No.: US 10,237,077 B2
(45) Date of Patent: Mar. 19, 2019

(54) METHOD FOR PROTECTED COMMUNICATION OF A VEHICLE

(71) Applicant: VOLKSWAGEN AG, Wolfsburg (DE)

(72) Inventors: Timo Winkelvos, Braunschweig (DE); Alexander Tschache, Wolfsburg (DE)

(73) Assignee: Volkswagen AG (DE)

(*) Notice: Subject to any disclaimer, the term of this patent is extended or adjusted under 35 U.S.C. 154(b) by 240 days.

(21) Appl. No.: 15/290,352

(22) Filed: Oct. 11, 2016

(65) Prior Publication Data

US 2017/0111178 A1 Apr. 20, 2017

(30) Foreign Application Priority Data

Oct. 16, 2015 (DE) .................. 10 2015 220 224

(51) Int. Cl.
*H04L 29/06* (2006.01)
*H04L 9/32* (2006.01)
(Continued)

(52) U.S. Cl.
CPC .......... *H04L 9/3263* (2013.01); *H04L 9/0819* (2013.01); *H04L 9/3247* (2013.01);
(Continued)

(58) Field of Classification Search
USPC .......................................................... 713/175
See application file for complete search history.

(56) References Cited

U.S. PATENT DOCUMENTS 8,316,237 B1 * 11/2012 Felsher ................ H04L 9/0825
380/282
8,452,969 B2 * 5/2013 Iyer .......................... H04L 9/14
713/176
(Continued)

FOREIGN PATENT DOCUMENTS

DE     10008973 A1    9/2001
DE  102007041177 A1    3/2009
(Continued)

OTHER PUBLICATIONS

Gupta et al.; KSSL: Experiments in Wireless Internet Security; SUN Microsystems; Nov. 2001.
(Continued)

*Primary Examiner* — Syed A Zaidi
(74) *Attorney, Agent, or Firm* — Barnes & Thornburg LLP (57) ABSTRACT

A method for protected communication by a vehicle which includes generating a key pair consisting of a private key and a public key and/or of one or more symmetric keys for the vehicle or for a controller of the vehicle in the area of influence of the vehicle manufacturer, generating a first certificate using the key pair, introducing the key pair and the first certificate and/or the symmetric key into the vehicle or the controller, authenticating the vehicle or the controller to a new communication partner by generation of a new key pair for this communication path and sending a signed message together with the certificate, and authenticating a new communication partner to the vehicle or the controller using a signed message and a public key, which are produced by the new communication partner on the basis of a certification by the vehicle manufacturer.

24 Claims, 3 Drawing Sheets

(51) Int. Cl.
*H04L 9/08* (2006.01)
*H04W 12/06* (2009.01)
*H04W 12/04* (2009.01)
*H04W 4/04* (2009.01)

(52) U.S. Cl.
CPC ........... *H04L 9/3268* (2013.01); *H04W 12/04* (2013.01); *H04W 12/06* (2013.01); *H04L 2209/84* (2013.01); *H04W 4/046* (2013.01)

(56) References Cited

U.S. PATENT DOCUMENTS

| | | | | |
|---|---|---|---|---|
| 2002/0023223 | A1* | 2/2002 | Schmidt | B60R 25/24 713/187 |
| 2003/0147534 | A1* | 8/2003 | Ablay | H04L 9/3271 380/270 |
| 2006/0239453 | A1* | 10/2006 | Halpern | H04L 63/0428 380/45 |
| 2009/0249074 | A1* | 10/2009 | Madhavan | H04L 9/3263 713/176 |
| 2010/0031042 | A1* | 2/2010 | Di Crescenzo | H04L 63/0869 713/169 |
| 2010/0040234 | A1* | 2/2010 | Alrabady | H04L 9/321 380/278 |
| 2010/0191973 | A1* | 7/2010 | Huntzicker | H04L 63/0823 713/176 |
| 2011/0083011 | A1* | 4/2011 | DiCrescenzo | H04L 9/006 713/158 |
| 2011/0238987 | A1* | 9/2011 | Kherani | H04L 1/0041 713/168 |
| 2011/0264916 | A1* | 10/2011 | Fischer | G07C 5/008 713/175 |
| 2012/0155636 | A1* | 6/2012 | Muthaiah | H04L 9/0825 380/44 |
| 2015/0143112 | A1* | 5/2015 | Yavuz | G06F 17/3033 713/165 |

FOREIGN PATENT DOCUMENTS

| | | |
|---|---|---|
| DE | 102007058975 A1 | 6/2009 |
| DE | 102009037193 A1 | 3/2010 |
| DE | 102010005422 A1 | 9/2010 |
| DE | 102009038035 A1 | 2/2011 |
| JP | 2008252353 A | 10/2008 |

OTHER PUBLICATIONS

Office Action for Korean Patent Application No. 10-2016-0131191; dated Mar. 2, 2018.

Arazi; Vehicular Implementations of Public Key Cryptographic Techniques; IEEE Transactions on Vehicular Technology; Aug. 3, 1991; vol. 40, No. 3; pp. 646-653.

Wikipedia, the free encyclopedia; Cryptographic nonce; Wayback Machine download from https://en.wikipedia.org/wiki/Cryoptographic_nonce; Jul. 27, 2015.

Search Report from European Patent Application No. 16189380.5; dated Feb. 23, 2017.

* cited by examiner

METHOD FOR PROTECTED COMMUNICATION OF A VEHICLE

PRIORITY CLAIM

This patent application claims priority to German Patent Application No. 10 2015 220 224.0, filed 16 Oct. 2015, the disclosure of which is incorporated herein by reference in its entirety.

SUMMARY

Illustrative embodiments relate to a method for protected communication by a vehicle.

BRIEF DESCRIPTION OF THE DRAWINGS

The disclosed embodiments are explained below on the basis of the associated drawings, in which.

DETAILED DESCRIPTION

For an increasing number of functions in vehicles that require protection by cryptographic functions, these functions each require cryptographic key material to be provided. For contemporary functions, either self-contained solutions are developed or existing systems are used that, per se, are not optimally designed therefor.

DE 100 08 973 A1 discloses a method for ensuring the data integrity of a piece of software for a controller of a motor vehicle in which a controller key pair and certificates are used to authenticate software that is to be installed in the controller.

DE 10 2009 038 035 A1 discloses a method for configuring infotainment applications in a motor vehicle in which the extent of software is changed.

DE 10 2009 037 193 A1 discloses a method for performing an interchange for an asymmetric key between a vehicle and a remote device, wherein a public key generated by the vehicle and descriptive data are stored at a location that the remote device can access.

The methods cited above authenticate software that is to be installed but not the setup of an authenticated communication.

Disclosed embodiments provide a secure key introduction system and key management system.

The disclosed method for protected communication by a vehicle comprises the operations of generating a key pair consisting of a private key and a public key and/or of one or more symmetric keys for the vehicle or for a controller of the vehicle in the area of influence of the vehicle manufacturer, generating a first certificate using the key pair, introducing the key pair and the first certificate and/or the (plurality of) symmetric key(s) into the vehicle or the controller, authenticating the vehicle or the controller to a new communication partner by means of generation of a new key pair for this communication path and sending of a signed message together with the certificate, and authenticating a new communication partner to the vehicle or the controller using a signed message and a public key, which are produced by the new communication partner on the basis of a certification by the vehicle manufacturer.

To a certain extent, the disclosed embodiments provide a circle of trust that allows a bidirectional communication, that is to say from the vehicle to a further subscriber and from a subscriber to the vehicle. The further subscriber or communication partner may be another vehicle, a fixture such as the factory or a server for a workshop or for a third-party provider, external services and new service providers or a controller within the vehicle.

The disclosed method has the benefits that a key introduction system and key management system is provided that provides a process-reliable key distribution given a standardized programming interface (API, Application Programming Interface). The use of key material is also possible with new—that is to say hitherto unknown to the vehicle—external subscribers without further communication other than the authenticity check with different controllers of the vehicle. The basis of trust stems from the manufacturer of the vehicle, and the manufacturer has the chains of trust completely under its own control. It therefore controls the relationships of trust for the vehicles itself. The method therefore allows a multiplicity of authentication concepts for the first time.

The disclosed embodiments allow the use of asymmetric and symmetric keys. The keys can each be used individually or in multiple form per controller or vehicle. Even though, for reasons of clarity, there are places in which only one option, such as an asymmetric key pair, for example, is mentioned, both options, that is to say asymmetric and symmetric keys, are always included. The signed message to the new communication partner or to the vehicle or the controller can be signed using a signature or a certificate. The signature allows a check on whether the message has been sent by an authentic sender.

The key introduction system and key management system can support different purposes of use, such as a protected communication within the vehicle, for example. Only through the use of different keys for the cryptographic authentication of messages on the vehicle-internal bus is it possible to achieve an authentic distinction between communication subscribers. Taking into consideration the conventional demands on cryptography (security is based on the keys), there is no possibility of a controller that is a subscriber to the circle of trust and the protected communication but is not in the same trusted group as other controllers not being able to derive the key material that is necessary to pass as a subscriber to this other trusted group.

Mobile online services are also supported by the disclosed method. Often, the mobile online services are linked to backend systems of the vehicle manufacturer retrospectively, for example, via already existing systems. These approaches admittedly meet all security-relevant demands. However, the existing systems are intended for purposes other than this, which can have negative repercussions for these systems. In the case of a dedicated PKI whose subscribers are the vehicles, this is overcome. A particular benefit is that the vehicles are authenticatable right from initial contact with a backend or unit for mobile online services even before direction to internal IT systems.

Similarly, it is possible to implement an authentication of communication services or networks such as Car2X or vehicle to grid, for example.

Further future instances of application are distinguished in that systems of the vehicle must authenticate themselves to external communication subscribers. Asymmetric cryptography is suitable for such instances of application because cryptographic operations can be performed between subscribers without prior dedicated key introduction on account of the public key components. A trust infrastructure (PKI) additionally allows the subscribers to trust the relevant public keys. The methods that are available at present allow neither the introduction of asymmetric keys nor involvement of the vehicles in a PKI and protected communication with external subscribers.

There are instances of application of mobile terminals for which first-time coupling of the devices is not possible, as today, from inside the vehicle (with additional "out-of-band" confirmation by the user). One such example is key transfers to smartphones for carsharing. Without confirmation of the coupling process at the vehicle end and on the cell phone, the transported or agreed keys are not authentic and therefore susceptible to Man-in-the-Middle attacks. The PKI presented here allows this to be rectified, for example, by virtue of security not being based on the authenticity of the technology-specific coupling mechanism, but rather a higher-level protected connection for the subscribers being provided on the basis of the certificates of the circle of trust.

Even when future external services or apps are linked, there are some instances of application that are possible only by virtue of the disclosed method. As such, apps and services that are not catered for from their own backend require an authentic connection with appropriate authentication mechanisms (for example, OAuth). For services hosted by the vehicle manufacturer itself, there is the demand on end-to-end security, depending on criticality. In this regard, the key introduction system and key management system presented provides great flexibility and extendability.

The disclosed method provides centrally controlled controller authentication. This is beneficial when controllers of external manufacturers, such as infotainment systems from other manufacturers, for example, need to be identified. This is possible through the use of the protected communication presented here within the vehicle on the basis of independent keys of the circle of trust. In this case, other devices establish that a subscriber is not authentic, instead of the subscriber itself establishing that it is in the wrong vehicle.

According to the method, the vehicle or a controller of the vehicle works as a dedicated certification entity for a public key infrastructure (PKI). This is beneficial when an online connection is not possible at all times and at all locations. This applies to all terminals that are mobile and that are not originally provided for setup of an online connection.

A master key can be generated in the area of influence of the vehicle manufacturer, and all keys used in vehicles can be generated by means of deterministic derivation from the master key. Such an approach simplifies the organization of key management. As such, a simple representation of this master key can be provided in a central database. This master key is then used as a derivation basis for all keys of all vehicles or of a particular group of vehicles, such as a model or a model range from the manufacturer.

A key data record can be used to introduce the key pair, the symmetric key and the certificate. This allows a standardized interface for introduction, which facilitates the method. The method is not limited to the use of asymmetric keys, it additionally being possible for symmetric keys to be used too. The key data record can comprise all of the components or just single components.

The key data record can contain information relating to an identification number for the vehicle and/or controller and/or for the type of key. The identification number may be the vehicle identification number (VIN), for example. Data are provided for the vehicle and/or for the controller or for other subscribers via encrypted and signed key data records. These can be used to provide the controller with, besides its cryptographic key material, information about the encryption interconnection in which it is installed, and also with meta information pertaining to its keys for the using application, if the keys are required.

During the manufacture of a controller for the vehicle, an initial key can be stored in the controller and the initial key can become invalid by means of the key pair and/or the symmetric key. The initial key is stored in the controller during or after manufacture and therefore extends the security or authentication domain to components before they are installed in the vehicle. This increases security further. The initial key can also be erased.

A key for cross-controller functions can be generated and can be introduced into multiple controllers of the vehicle. Since such a group key can be used to cater for a group of controllers, the number of keys and the effort can be reduced. By way of example, a navigation controller and a GPS controller can belong to a group key, so that both can be addressed by means of the group key for a function with GPS navigation.

Multiple key pairs and/or keys can be introduced into a controller of the vehicle. This allows the scope of functions of the encryption to be extended. For example, a key for a single controller, a key for cross-controller functions and one or more communication keys can be used. Each key or key pair has an associated specific field of use and/or an associated particular subscriber or communication circle.

The new communication partner may be a further controller in the vehicle or a device that is external to the vehicle. For example, there may be in the vehicle a master/slave configuration in which one controller adopts the master position for encryption or encrypted communication while further controllers adopt slave positions. The external device may be another vehicle, a workshop or a server of a service provider, for example. The generally valid method can cooperate with each communication partner that is reachable via a wired or wireless communication channel, such as a mobile radio link, for example, and that is configured to communicate in encrypted form, for example, by means of asymmetric encryption.

The area of influence of the vehicle manufacturer may comprise a production site for the vehicle and/or a backend of the manufacturer. The term area of influence can be interpreted within a security context rather than exclusively geographically. For example, the keys, certificates and download containers that are introduced into the vehicle at the production site can be produced in a backend under secure conditions. The key derivation can also take place during production, for example, directly in the vehicle.

A root certificate of the manufacturer can be introduced into the vehicle, and the root certificate can be sent to the new communication partner. The root certificate can be used to corroborate the validity of all subordinate certificates. The root certificate forms the shared trust anchor for all certificates subordinate to it. This option can be used to implement a completely hierarchic PKI.

A certification center of the vehicle manufacturer can generate a manufacturer certificate and transmit it to the new communication partner and the new communication partner can check the second certificate received from the vehicle using the root certificate, the manufacturer certificate, the certificate and the signature of the message. In this way, the whole certification chain can be verified and great flexibility can be provided for key production and management.

On generation of the key pair and/or the symmetric key for the vehicle or for a controller of the vehicle, a serial number for the vehicle and/or the controller can be stored in the area of influence of the vehicle manufacturer. Such entry or storage of the serial number in a database or the backend facilitates organization of the circle of trust.

On a fresh request for a key pair and/or key, it is possible, when a serial number of the vehicle or of the controller does not match the stored serial number, for computation of a new key pair and/or key that is to be transmitted to the vehicle or to the controller to be preceded by a key identity counter for the key pair being incremented. All other system subscribers in the encryption interconnection that contain these keys will likewise be provided with appropriate key pairs or key data records that receive these new keys. In this way, it is possible for keys or key pairs to be replaced simply and securely, ensuring process reliability for the keys throughout the life cycle.

The vehicle or the controller can accept the new key pair and/or key only if the key identity counter contained is greater than or equal to the currently stored key identity counter. This security check can be used to implement the key identity counter simply and effectively and to increase process reliability. A further option is for all keys or key pairs to be swapped.

Further disclosed embodiments will emerge from the remainder of the features.

The various disclosed embodiments that are cited in this application are combinable with one another, unless stated otherwise on a case by case basis.

Figure 1:
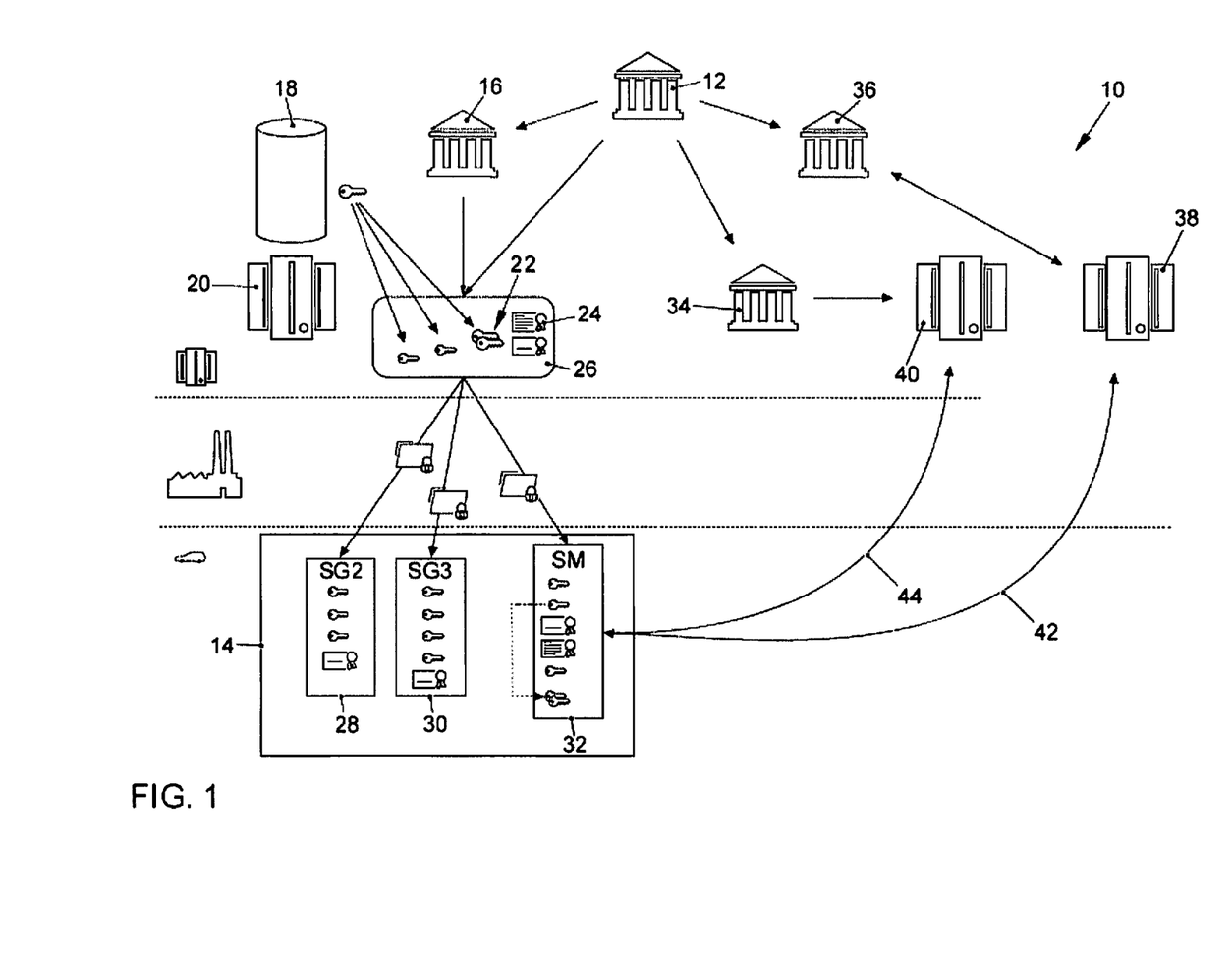
FIG. 1 shows a schematic representation of a PKI circle of trust.

FIG. 1 shows a schematic representation of a PKI circle of trust 10, which can also be referred to as a vehicle key management system. A root certification center (CA) 12 serves as a trust anchor for the whole public key infrastructure (PKI). The root certification center 12 is situated in the area of responsibility, for example, in a computer center, of the manufacturer of vehicles 14. There are multiple sub-CAs, which issue the certificates for the different instances of application. As such, a vehicle CA 16 signs the certificates for the asymmetric vehicle identities. The whole PKI 10 comprises the shared root CA 12 and multiple sub-CAs for dedicated instances of application. Additionally, all issued certificates belong to the PKI 10.

A key database 18 is used to generate, store, manage and make available new keys or key pairs. The key database 18 may be integrated in existing database systems of the manufacturer. Similarly, it is possible for the key management to be relocated to an allied company or one appointed to undertake this, for example.

In a backend unit 20, such as a computation unit or a computer center, the keys or key pairs 22 are derived, combined with the certificates 24 and made available as a key data record 26. The units root CA 12, vehicle CA 16, key database 18 and backend unit 20 can also be combined to form a single or a few unit(s). In this case, they are shown individually due to logical division. All of the units already described are logically located upstream of production of the vehicles 14, and as a general custom, this is referred to as backend. Backend can also be regarded as a backend of a telematics service provider, for example.

The central backend generates the required cryptographic keys 22 on request for a vehicle 14 and its controllers 28, 30, 32. For an initial provision of data, the backend is notified of both the vehicle identification number VIN of the vehicle 14 and of an installation list of the controllers 28, 30, 32 that are to be provided with data and of keys that are to be provided. Following key generation, these data are stored in the key database 18 for later reference.

The backend provides interfaces both for data provision processes during production of the vehicle 14 for initial provision of data and for subsequent data provision processes during field operation. The latter interface may be necessary for swapping and spare parts processes.

As part of the PKI 10, the vehicle CA 16 provides individual controllers with signed certificates 24 on the basis of the key material, the certificates being able to be used for identifying the vehicle 14 or the controllers 28, 30, 32 thereof to other entities. To this end, the PKI 10 contains at least the following entities. The root CA 12 serves as a basis of trust, further function-dependent CAs, such as the vehicle CA 16 or a CA for mobile online services 34 for supporting mobile online services, for example, are present and a bridge or interface 36 is used as an interface for external subscribers 38. The bridge or interface 36 is used to sign the certificates of the external subscribers 38 from the manufacturer PKI 10, to allow authentication of the external services 38 to the vehicle 14.

At least one internal service provider 40 for providing internal services is also part of the PKI or of the circle of trust 10. In this case, internal is understood to mean that the manufacturer of the vehicle 14 provides these services, such as mobile online services, for example. This internal service provider 40 is linked to the root CA 12 via the CA for mobile online services 34.

Since the internal and external services, like the vehicle 14 with its controllers 28, 30, 32, each have a complete certification path for the root CA 12, the vehicle can use asymmetric cryptography methods to authenticate itself to the internal and external services. Equally, the internal and external services can authenticate themselves to the vehicle 14 or the controllers 28, 30, 32 thereof. This is shown in FIG. 1 by the bidirectional connections 42 and 44 between the vehicle 14 and the external subscriber 38 and also the internal service provider 40. Hence, a circle of trust 10 that can always be attributed to the root CA 12 is obtained for the PKI as a whole.

Figure 2:
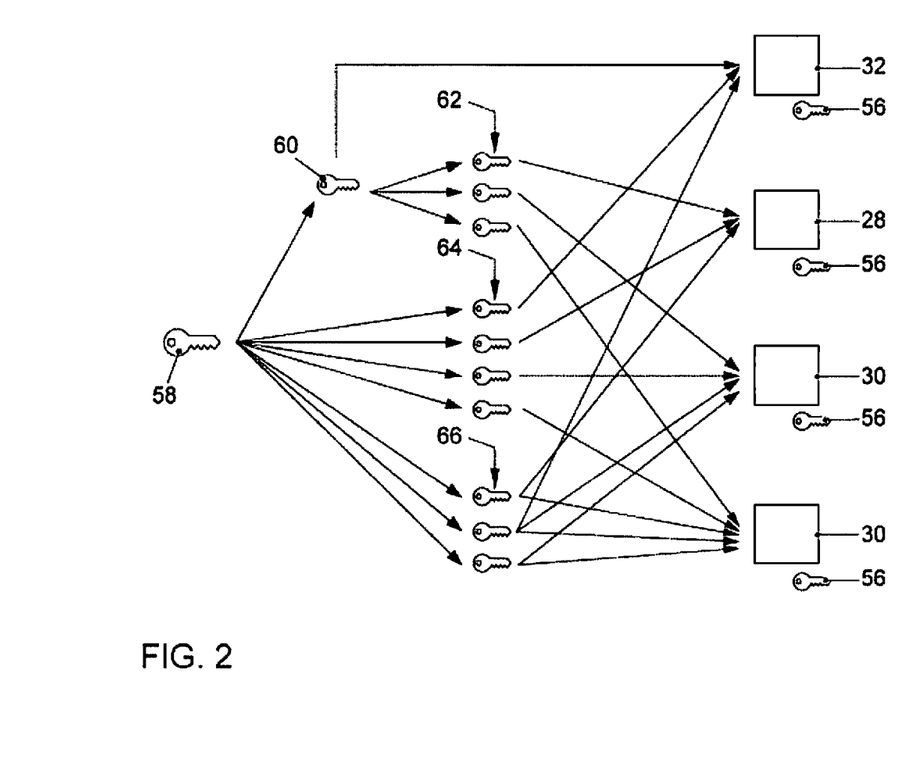
FIG. 2 shows a schematic overview of introduced keys.

The key hierarchy and the derivation of the keys are described below on the basis of FIG. 2. The generation of cryptographic keys for a subscriber to the circle of trust generally distinguishes between two types of keys. Keys that are individual per controller and keys that are distributed to multiple controllers within a vehicle. In this description, a controller is cited as a representative of a subscriber to the circle of trust. It is also possible for other components of a vehicle to be used, such as other computation units, for example.

The fundamental keys of the circle of trust are described below. What are shown are multiple keys that are assigned or have been assigned to individual controllers 20, 30, 32 of the vehicle. In this example, the controller 32 serves as master controller for the communication and/or encryption. The master controller can act as a vehicle-internal CA for signing asymmetric keys for other controllers of the vehicle or as a time master for a CAN bus. It is likewise possible for each controller to be its own controller-internal CA.

The initial key 56 is the key of a subscriber to the circle of trust that is introduced by the supplier or manufacturer of the controller or subscriber. The initial key 56 is used for encrypting and signing the key data record when the controller is first provided with data. It can be replaced in the data provision process by a key specifically for this controller. This key can then be used to encrypt and sign all further key data records and for other administrative functions that relate to the controller in respect of the circle of trust.

The provision of data by the supplier is effected in a protected environment, so that the initial keys 56 are prevented from becoming known.

From the point of view of the vehicle manufacturer, a basic key 58 is first of all generated. The basic key 58 is deduced in the database 18 and stored. All other keys for all vehicles or a group of vehicles are derived from this basic key 58.

As such, a master communication key 60 is derived from the basic key 58. It is used in a master/slave interconnection to equip both master and slave with shared keys, so that the master and slave can communicate with one another in protected state.

To this end, further communication keys for controllers 62 are derived from the master communication key 60 and distributed to the slaves 28, 30.

Further, keys for controllers 64 are generated from the basic key 58. Such a key 64 is known exclusively to this one controller in the vehicle. Each function that requires such a key is provided with its own key 64.

Additionally, keys for cross-controller functions 66 are generated from the basic key 58. These keys 66 are derived from the vehicle identification number VIN of the circle of trust. In contrast to keys for controllers 64, a cross-controller key 66 is distributed to multiple subscribers and therefore allows distributed functions to access the same key material. The cross-controller key 66 can therefore be used for function-related protected communication within the vehicle, for example.

All data provision processes are entered in the backend, specifically in the database 18, and are therefore accountable. The backend keeps, for each vehicle, a history of the installed subscribers that contains all the information to be able to generate the keys that a subscriber contains. The data provision processes comprise both initial data provision and a repeated data provision, that is to say a fresh data provision for a subscriber that has already been provided with data. By way of example, a repeated data provision is necessary if a controller that has already been provided with data needs to be swapped to a different interconnection of subscribers, or a key of the subscriber needs to be swapped.

Subscribers to the circle of trust are provided with data via encrypted and signed key data records. These are used to provide the controller with, besides its cryptographic key material, information about the interconnection in which it is installed, and also optionally with meta information pertaining to its keys for the using application, if the keys are required.

To create an interconnection or circle of trust, the backend is notified of what assemblies or controller classes participate in the interconnection, what functionality needs to be provided as key material, how the relevant derivation paths are organized and what the vehicle identification number VIN of the target vehicle is. Only then can the backend deduce the necessary keys and provide them for the relevant subscribers as key data records. The configuration of the interconnection is stored in the backend. Requests for key data records for a controller class or for keys that have not been reported as part of the interconnection are rejected.

The terms assemblies and controller classes are cited here by way of example as possible subscribers to the PKI circle of trust 10. Further possible subscribers are individual components, controllers or other elements and component groups, for example. One controller class is a class for navigation controllers, for example. This class then includes multiple or all controllers for navigation, for example, and these may then be controllers of different design.

Following the creation of an interconnection for a vehicle, it still has no associated controllers but rather has only assigned controller classes that will become part of the interconnection. On a request for a key data record for an assembly for which a controller has not yet been entered, that is to say an initial request, the necessary keys are generated in the backend on the basis of the data stored therein. Accordingly, the controller for which the request has been made is entered with its serial number as being associated with the interconnection.

Modification of an interconnection is swapping an existing subscriber to the interconnection for a different controller. On requests for a key data record for a controller class for which a controller has already been entered as being associated with the interconnection and the serial number does not match the entered serial number, a swap process or exchange process is initiated. Prior to the computation of the new keys that are transmitted to the controller, the key identity counters for all keys that the controller will receive, and that need to be swapped, are increased by 1 for the keys. From this, it is established that the key needs to be swapped and an association with the currently used key is made possible. A guarantee is provided that the keys of the old subscriber are no longer valid in the vehicle. All other subscribers to the interconnection that contain these keys must likewise receive appropriate key data records that receive these new keys.

When a key data record is introduced for a key, the controller accepts this key data record only if the key identity counter contained is greater than or equal to the currently stored key teach counter.

In the course of the data provision process, a subscriber can receive a signed certificate that either this controller uses as an internal sub-CA or that can be used directly as an identification feature. This certificate has been signed by the backend as a vehicle identity CA.

Figure 3:
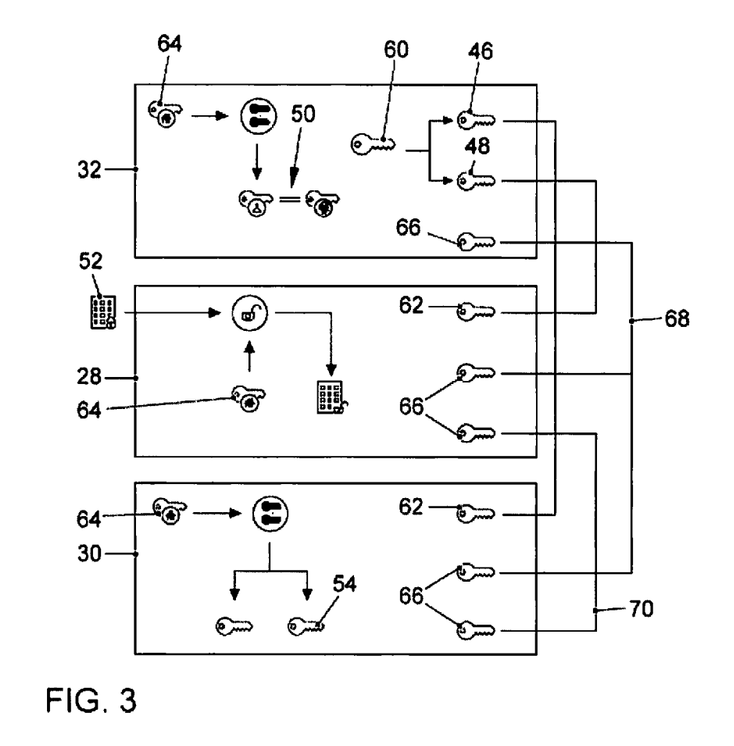
FIG. 3 shows a schematic representation of key functions in controllers.

FIG. 3 shows the controllers 28, 30 and 32 and also functions of keys. The controller 32 is a master controller and therefore contains a master communication key 60. From the master communication key 60, two keys or key pairs 46, 48 are generated for the purpose of communication with the two controllers 28 and 30. In this way, it is possible for the controller 32 and the controller 28 to communicate with one another using the key 48 and the communication key 62 of the controller 28. Accordingly, the controller 32 and the controller 30 can communicate with one another using the key 46 and the communication key 62 of the controller 30.

Using a key for cross-controller functions 66, all three controllers 28, 30 and 32 in a group 68 can communicate with one another in protected state, and using a further key for cross-controller functions 66, the two controllers 28 and 30 in a group 70 can communicate with one another in protected state. As can be seen, there are multiple keys and key pairs for different functions and/or communication circles per controller.

In the controllers 28, 30 and 32, further examples of functions of the keys, in this case of keys for a controller 64, are shown.

In the controller 32, an asymmetric ECC key pair 50, for example, is generated from the individual key 64. Methods based on elliptic curves are referred to as ECC (Elliptic Curve Cryptography) methods and allow faster and more efficient cryptographic methods than the simple Diffie-Hellman method. The master controller 32 can thus generate further key pairs for further tasks, which are unknown even for data provision for the controller, from its individual key 64.

In the controller 28, the individual key 64 for this controller 28, for example, is used to decrypt incoming encrypted data and to render them usable by the controller 28. These data may be instructions or messages from the backend, a key data record or further information.

In the controller 30, further keys 54 are generated from the individual key 64 for this controller 30. It is therefore evident that even a slave controller 28, 30 can generate new keys or key pairs from its respective individual key 64.

All keys in the vehicle are deterministic and hence can be reproduced by the backend.

LIST OF REFERENCE SYMBOLS

10 PKI circle of trust
12 Root CA
14 Vehicle
16 Vehicle CA
18 Key database
20 Backend unit
22 Key
24 Certificate
26 Key data record
28 Controller
30 Controller
32 Controller
34 CA for mobile online services
36 Bridge
38 External subscriber
40 Internal service provider
42 Connection
44 Connection
46 Key
48 Key
50 Asymmetric ECC key pair
52 Encrypted data
54 Further keys
56 Initial key
58 Master key
60 Master communication key
62 Communication key
64 Key for a controller
66 Key for cross-controller functions
68 Group
70 Group

The invention claimed is:

1. A method for protected communication by a vehicle, the method comprising:
generating a key pair consisting of a private key and a public key and/or of one or more symmetric keys for the vehicle or for a controller of the vehicle in an area of influence of a vehicle manufacturer;
storing, in response to a generation of the key pair and/or the symmetric key for the vehicle or for a controller of the vehicle, a serial number for the vehicle and/or the controller is stored in the area of influence of the vehicle manufacturer;
generating a first certificate using the key pair;
introducing the key pair and the first certificate and/or the symmetric key or plurality of symmetric keys into the vehicle or the controller;
authenticating the vehicle or the controller to a new communication partner by generation of a new key pair for a particular communication path and sending of a signed message together with a corresponding certificate;
authenticating a new communication partner to the vehicle or the controller using a signed message and a public key, which are produced by the new communication partner based on a certification by the vehicle manufacturer;
receiving a fresh request for a key pair and/or key;
incrementing, in response to a determination that a serial number of the vehicle or of the controller does not match the stored serial number, a key identity counter for the key pair and/or key; and
generating, in response to incrementing the key identity counter, a new key pair and/or key to be transmitted to the vehicle or to the controller.

2. The method of claim 1, wherein a master key is generated in the area of influence of the vehicle manufacturer and wherein all keys used in vehicles are generated by deterministic derivation from the master key.

3. The method of claim 1, wherein a key data record is used to introduce the key pair, the symmetric keys and the corresponding certificate.

4. The method of claim 3, wherein the key data record contains information relating to an identification number for the vehicle and/or controller and/or for the type of key.

5. The method of claim 1, wherein, during the manufacture of a controller for the vehicle, an initial key is stored in the controller and the initial key becomes invalid by the key pair and/or the symmetric key.

6. The method of claim 1, wherein a key for cross-controller functions is generated and introduced into multiple controllers of the vehicle.

7. The method of claim 1, wherein multiple key pairs and/or symmetric keys are introduced into a controller of the vehicle.

8. The method of claim 1, wherein the new communication partner is a further controller in the vehicle or a device that is external to the vehicle.

9. The method of claim 1, wherein the area of influence of the vehicle manufacturer comprises a production site for the vehicle and/or a backend of the manufacturer.

10. The method of claim 1, wherein a root certificate of the manufacturer is introduced into the vehicle and the root certificate is sent to the new communication partner.

11. The method of claim 10, wherein a certification center of the vehicle manufacturer generates a manufacturer certificate and transmits the manufacturer certificate to the new communication partner and the new communication partner checks the certificate received from the vehicle using the root certificate, the manufacturer certificate, the certificate and the signature of the message.

12. The method of claim 1, wherein the vehicle or the controller accepts the new key pair and/or key only if the key identity counter contained is greater than or equal to the currently stored key identity counter.

13. A controller included in a corresponding vehicle, the controller protecting communication by the vehicle, wherein a key pair consisting of a private key and a public key and/or of one or more symmetric keys is generated for the controller or the corresponding vehicle in an area of influence of a vehicle manufacturer, the key pair and a first certificate generated using the key pair and/or the symmetric key or plurality of symmetric keys being introduced into the controller or the corresponding vehicle, wherein authentication of controller or the corresponding vehicle to a new communication partner is performed by generating a new key pair for a particular communication path and sending of a signed message together with the corresponding certificate, and a new communication partner is authenticated to the controller or the corresponding vehicle using a signed message and a public key, which are produced by the new communication partner based on a certification by the vehicle manufacturer, wherein, on generation of the key pair and/or the symmetric key for the controller or the corresponding vehicle, a serial number for the controller and/or the corresponding vehicle is stored in the area of influence of the vehicle manufacturer, and wherein, in response to a fresh request for a key pair and/or key, when a serial number of the controller or the corresponding vehicle does not match the stored serial number, computation of a new key pair and/or key that is to be transmitted to the controller or the corresponding vehicle is preceded by a key identity counter for the key pair and/or key being incremented and a new key is generated.

14. The controller of claim 13, wherein a master key is generated in the area of influence of the vehicle manufacturer and wherein all keys used in vehicles are generated by deterministic derivation from the master key.

15. The controller of claim 13, wherein a key data record is used to introduce the key pair, the symmetric keys and the certificate.

16. The controller of claim 15, wherein the key data record contains information relating to an identification number for the vehicle and/or controller and/or for the type of key.

17. The controller of claim 13, wherein, during the manufacture of a controller for the vehicle, an initial key is stored in the controller and the initial key becomes invalid by the key pair and/or the symmetric key.

18. The controller of claim 13, wherein a key for cross-controller functions is generated and introduced into multiple controllers of the vehicle.

19. The controller of claim 13, wherein multiple key pairs and/or symmetric keys are introduced into a controller of the vehicle.

20. The controller of claim 13, wherein the new communication partner is a further controller in the vehicle or a device that is external to the vehicle.

21. The controller of claim 13, wherein the area of influence of the vehicle manufacturer comprises a production site for the vehicle and/or a backend of the manufacturer.

22. The controller of claim 13, wherein a root certificate of the manufacturer is introduced into the vehicle and the root certificate is sent to the new communication partner.

23. The controller of claim 22, wherein a certification center of the vehicle manufacturer generates a manufacturer certificate and transmits the manufacturer certificate to the new communication partner and the new communication partner checks the certificate received from the vehicle using the root certificate, the manufacturer certificate, the certificate and the signature of the message.

24. The controller of claim 13, wherein the vehicle or the controller accepts the new key pair and/or key only if the key identity counter contained is greater than or equal to the currently stored key identity counter.

* * * * *